(12) United States Patent
Eykelkamp

(10) Patent No.: US 6,631,608 B1
(45) Date of Patent: Oct. 14, 2003

(54) EXTENDABLE TOOL ATTACHMENT MECHANISM FOR A LAWN CARE VEHICLE

(75) Inventor: William J. H. Eykelkamp, Neede (NL)

(73) Assignee: Roberine BV, Enschede (NL)

( * ) Notice: Subject to any disclaimer, the term of this patent is extended or adjusted under 35 U.S.C. 154(b) by 0 days.

(21) Appl. No.: 09/298,742

(22) Filed: Apr. 23, 1999

(30) Foreign Application Priority Data

Apr. 24, 1998 (EP) .............................................. 98107491

(51) Int. Cl.⁷ ........................ A01D 34/03; A01D 34/43; A01D 34/64
(52) U.S. Cl. ........................................ 56/15.6; 56/14.9
(58) Field of Search ................................ 56/15.6, 15.7, 56/15.8, 16.7, DIG. 22, 3, 10, 15.9, 14.9, 16.1, 16.2, DIG. 14; 230/124.189, 124.136, 124.141; 172/677, 683, 684, 776, 311, 310, 315

(56) References Cited

U.S. PATENT DOCUMENTS

| | | | |
|---|---|---|---|
| 2,959,233 A | 11/1960 | Scarlett et al. ............. 172/274 |
| 3,221,482 A | 12/1965 | Cowling ..................... 56/25.4 |
| 3,274,762 A * | 9/1966 | Jolls ........................ 56/15.2 |
| 3,460,012 A | 8/1969 | Henegar et al. ............. 318/18 |
| 3,687,475 A * | 8/1972 | Wiczer ...................... 280/36 C |
| 3,757,500 A | 9/1973 | Averitt ...................... 56/6 |
| 3,762,577 A * | 10/1973 | Olmo et al. ................. 214/1 R |
| 3,896,904 A * | 7/1975 | Walker ....................... 187/9 R |
| 3,912,037 A | 10/1975 | Krieg ........................ 180/98 |
| 4,206,580 A * | 6/1980 | Truax et al. ................ 56/10.4 |
| 4,428,183 A * | 1/1984 | Lowry et al. ................ 56/17.2 |
| 4,563,019 A | 1/1986 | Kuhn et al. ................. 280/481 |
| 4,681,360 A * | 7/1987 | Peters et al. ............... 296/37.6 |
| 4,779,406 A | 10/1988 | Schroeder ................... 56/15.9 |
| 4,901,508 A * | 2/1990 | Whatley ..................... 56/10.4 |
| 4,919,445 A * | 4/1990 | Robey ....................... 280/149.2 |
| 4,936,391 A * | 6/1990 | Cameron ..................... 172/78 |
| 4,936,746 A | 6/1990 | Mayo et al. ................. 416/46 |
| 5,026,176 A * | 6/1991 | Jensen et al. ............... 384/53 |
| 5,042,236 A | 8/1991 | Lamusga et al. .............. 56/7 |
| 5,079,907 A | 1/1992 | Sameshima et al. ........... 56/15.9 |
| 5,135,348 A | 8/1992 | Kishi et al. ................ 414/695.8 |
| 5,423,565 A * | 6/1995 | Smith ....................... 280/411.1 |
| 5,425,224 A * | 6/1995 | Downey et al. .............. 56/15.8 |
| 5,470,175 A * | 11/1995 | Jensen et al. ............... 404/72 |
| 5,475,971 A | 12/1995 | Good et al. ................. 56/14.9 |
| 5,533,326 A * | 7/1996 | Goman et al. ................ 56/7 |
| 5,575,362 A * | 11/1996 | Franklin et al. ............. 190/115 |
| 5,600,943 A | 2/1997 | Ryan ........................ 56/13.6 |
| 5,692,712 A * | 12/1997 | Weinschenk, Jr. et al. ..... 248/118 |
| 5,715,893 A * | 2/1998 | Houck ....................... 172/311 |
| 5,727,920 A * | 3/1998 | Hull et al. ................. 414/476 |
| 5,771,672 A * | 6/1998 | Gummerson .................. 56/15.4 |
| 5,772,229 A * | 6/1998 | Cattau ...................... 280/438.1 |
| 5,865,457 A * | 2/1999 | Knabusch et al. ............ 280/304.1 |
| 5,871,328 A * | 2/1999 | Pinkston .................... 414/477 |
| 5,957,798 A | 9/1999 | Smith, III et al. .......... 475/5 |
| 5,979,640 A | 11/1999 | Horton ...................... 198/770 |
| 6,131,668 A * | 10/2000 | Houska ...................... 172/253 |
| 6,132,134 A * | 10/2000 | Hodgson ..................... 404/112 |
| 6,147,466 A | 11/2000 | Stronczek .................. 318/443 |

FOREIGN PATENT DOCUMENTS

| | | |
|---|---|---|
| EP | 0 182 229 A2 | 11/1985 |
| EP | 0 217 773 A1 | 9/1986 |
| GB | 2 105 807 A | 3/1983 |

\* cited by examiner

*Primary Examiner*—Árpád Fábián Kovács

(57) ABSTRACT

A lawn care vehicle with a tool attachment such as spiral-bladed mowing units arranged in front and underneath the lawn care vehicle in offset fashion. A tool frame to which the tool attachments are mounted is received within rails for allowing the tool frame to shift longitudinally with respect to the rails, thereby allowing the tool frame and tool attachments to shift outwardly with respect to the vehicle frame to maintenance positions.

11 Claims, 4 Drawing Sheets

EXTENDABLE TOOL ATTACHMENT MECHANISM FOR A LAWN CARE VEHICLE

BACKGROUND OF THE INVENTION

The invention pertains to a lawn care vehicle with a tool attachment that is supported by the vehicle frame.

Garden and lawn care vehicles usually contain attachments that are connected to the body of the vehicle by carrying devices. These attachments may consist of lawn care equipment, e.g., mowers with spiral or rotating blades, vertical cutters, raking devices or the like. The attachments are arranged on the body of the vehicle via the carrying devices such that their height can be adjusted, i.e., they can be moved between an operating position, whereby they are in contact with the ground, and a raised position for transport or service.

EP-A1 0,217,773 pertains to a riding lawn mower with a chassis that carries a drive unit. This drive unit drives the wheels as well as a cutting device that is separably attached to the chassis. The cutting device can be moved between a lower cutting position and an upper non-cutting position. This adjustment is realized by means of a lever arrangement that makes it possible to adjust the cutting height and completely raise the cutting device. In all these positions, the cutting device remains underneath the vehicle, i.e., the cutting device must be detached for maintenance and service purposes because it is not accessible.

U.S. Pat. No. 5,079,907 describes a riding lawn mower that contains a grass cutting device and a blade housing, both of which can be moved between an essentially horizontal mowing position and an upwardly tilted service position. The blade housing is suspended on an adjustment mechanism, one end of which is connected to the blade housing, and the other end of which is connected to the body of the vehicle. In its raised position, the blade housing is tilted toward the rear by the adjustment mechanism in order to gain access to the blades located in the housing. However, such a design can only be realized if the cutting device can be freely moved, i.e., if the cutting device is not entirely or only partially arranged underneath the vehicle.

U.S. Pat. No. 5,042,236 discloses a golf lawn mower with a total of five spiral-bladed mowing units. In this case, three spiral-bladed mowing units are arranged in front of the golf lawn mower, and two spiral-bladed mowing units are arranged laterally offset to the three front spiral-bladed mowing units, i.e., underneath the vehicle frame. This arrangement serves for mowing strips of lawn remain between the front spiral-bladed mowing units with the spiral-bladed mowing units offset such that a uniform lawn pattern can be achieved. Here, the front spiral-bladed mowing units are accessible for maintenance and service purposes, but access to the rear spiral-bladed mowing unit is very difficult.

EP-B1 0,182,229 pertains to a farm tractor with a so-called front hitch that is arranged on the frame of the farm tractor in horizontally movable fashion. The front hitch serves, for example, for accommodating a mowing mechanism, a soil cultivation device or the like. The horizontal movability makes it possible to alter the existing leverages in such a way that the front wheels can be subjected to a higher load and thus generate a higher tensile force. However, neither the front hitch nor the tool attachment carried by the front hitch is arranged underneath the farm tractor or is otherwise covered.

It would therefore be desirable to improve the accessibility of the tool attachments in known garden and lawn care vehicles.

SUMMARY OF THE INVENTION

The present invention provides a vehicle having a vehicle frame and elongate rail members mounted therewith. A tool frame is provided to which is coupled a tool attachment such as an offset arrangement of spiral bladed reel mower cutting units. The tool frame includes bars which shiftably engage the rails along the length of the elongate rails, and the rails support the bars of the tool frame as the bars and tool frame shift linearly within the rails. The tool frame shifts between a retracted operating position whereat the cutting units are in an operating position in close proximity to the vehicle, and an extended maintenance position whereat the cutting units are shifted outwardly from the vehicle frame for providing access to the cutting units. The bars are received within the respective rails and are shiftable therein in telescoping fashion. When the cutting units are in the operating position one of the cutting units is at least partially within the boundary of the vehicle.

The rails are oriented at an angle to a surface of the ground, and the tool frame shifts generally along the rails upwardly and outwardly away from the vehicle as the tool frame shifts to the extended maintenance position.

The rails according to the preferred embodiment extend generally longitudinally in the direction of vehicle travel and the tool frame is shiftable along the rails generally longitudinally in the direction of vehicle travel. A linear actuator or hydraulic cylinder engages one of the bars of the tool frame for shifting the tool frame between the extended and retracted positions.

A plurality of toothed wheels are provided in engagement with respective toothed rack members fixed with the bars. The wheels are fixed with a shaft supported by the vehicle, and the wheels and shaft rotate in unison to synchronize the shifting of the bars with respect to the rails.

A support is mounted with the vehicle frame and engages the tool frame in the retracted position for at least partially supporting the tool frame in the retracted position.

Each bar is movably carried within the rail between at least one lower and one upper support roller.

The present invention provides tool units located beneath the operating platform or the vehicle frame, and which can be displaced outwardly, i.e., beyond the contours of the lawn care vehicle. Consequently, the tool attachment is easily accessible to the operator. The tool may consist of a mower, e.g., a spiral-bladed or rotating blade lawn mower, a raking device, a clearing blade, a vertical cutter, a soil aerator, a manure spreader or the like. Depending on the position of the tool attachment, it may be practical to move said tool attachment outwardly from the front, the rear or the side of the vehicle in order to gain access.

Particular advantage is attained due to the use of an inclined guideway for the tool attachment on the vehicle frame. In this way, the tool attachment can not only be moved out of the area located underneath the lawn care vehicle, e.g., under a protective cover, under the vehicle frame, under an operating platform or the like, but also be raised such that it can be serviced even more easily.

The use of at least one bar according to the present invention that is movably accommodated in or on a rail of the vehicle frame represents a robust and simultaneously simple and inexpensive arrangement for carrying the tool attachment. A long guide way, e.g., a telescoping guide way, also helps prevent the occurrence of jams during movement.

If several offset tool units are provided, it is possible to arrange a central tool unit between adjacent tool units, i.e., offset toward the lawn care vehicle, so that the central tool unit occupies, for example, the space between two wheels. In this way, the structural length of the lawn care vehicle can be relatively short, i.e., the lawn care vehicle is more compact.

Within the spirit of the present invention, the adjustment of the frame may be carried out manually, with a mechanical winch or the like. When using heavy tool attachments, it is advantageous to carry out this adjustment by means of a motor that can preferably be remote-controlled.

Resistance against lateral forces can be achieved if the bar of the tool frame is movably arranged in a closed profile, i.e., a tube, wherein one or more longitudinal slots are provided in order to connect the motor if the motor is not arranged concentric with the bar or the rail. Alternatively, the bar may also be realized in the form of a tube, wherein the rail is realized in the form of a carrier, on which the tube is movably arranged.

The movement of two or more bars can be realized with the aid of only one motor if the respective bars are connected to one another such that they move synchronously and cannot become jammed. The shifting of the bars can be synchronized by a shaft to which geared wheels or friction wheels are fixed. The wheels can engage respective bars and by way of the shaft help insure that the bars shift together. Synchronous movement of the bars can be achieved since toothed wheels and toothed racks are used to lock the bars together, which results in no slippage.

The use of at least one abutment and at least one support on the tool attachment and the lawn care vehicle makes it possible to prevent the weight from affecting the steering when the tool attachment is retracted, i.e., in its normal position. In this way, shocks caused by uneven terrain are barely, if at all, introduced into the bars and rails.

A sensor may be provided in order to prevent accidents during the servicing of the tool attachment. This sensor detects when the tool attachment is moved out of its operating position, i.e., that the tool attachment is presumably moved into its maintenance and service position. This sensor may be coupled to motors for driving and/or retracting and/or pivoting the tool attachment by means of simple electrical or electronic switching elements or a computer-assisted control unit, in such a way that the motors are prevented from being activated when the tool attachment is out of its operating position.

According to an additional feature, a mechanical locking device that is manually actuated may be provided. This locking device secures the tool attachment to the vehicle frame when it is not in its operating position. This may be simply realized by means of a bolt that is inserted through aligned openings in the tool attachment and the vehicle frame.

If the tool attachment contains three spiral-mower tool units that are movably held on the tool frame in overlapping fashion, and if the outer tool units can be vertically pivoted into an idle position, the outer tool units will not only be easier to access because they are able to assume a vertical orientation, but they will also be able to be maintained or serviced in a narrow garage.

The bar is guided with little resistance to movement by means of a lower support roller and an upper support roller between the bar and the rail.

DETAILED DESCRIPTION OF THE PREFERRED EMBODIMENT

Figure 1:
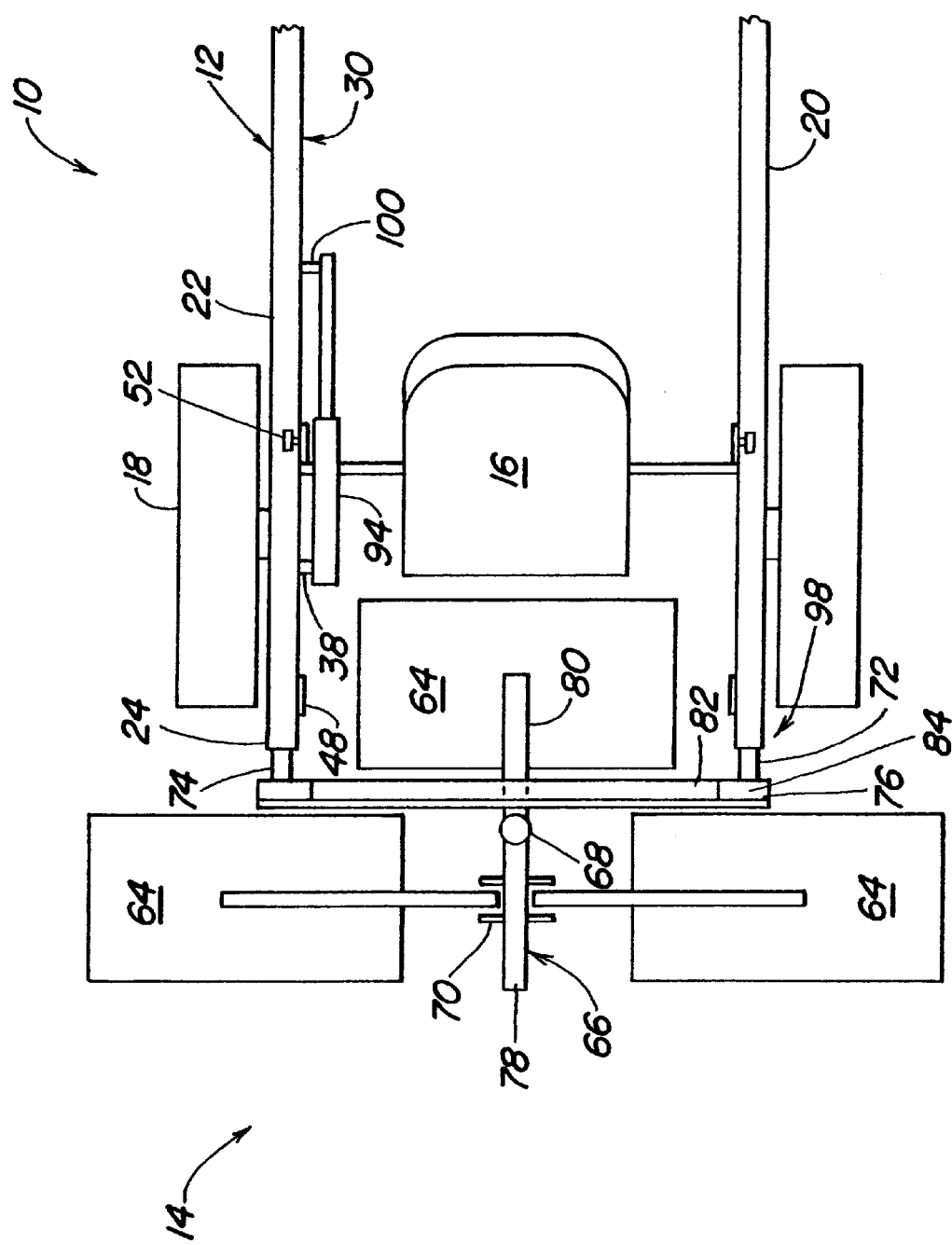
FIG. 1 is a partial schematic representation of a top view of a lawn care vehicle with vehicle frame and tool attachment.

The lawn care vehicle 10 shown in FIG. 1 contains a vehicle frame 12 and a tool attachment 14, wherein only the front end region of the lawn care vehicle is shown.

In the preferred embodiment, the lawn care vehicle 10 is realized in the form of a self-propelled lawn or golf course mower. However, the lawn care vehicle 10 could also be realized in the form of a towed vehicle. This lawn care vehicle 10 is provided with standard equipment (not shown) such as a motor, gearbox, driving platform and the like, i.e., this lawn care vehicle essentially corresponds in many ways to the initially described known vehicles.

Figure 4:
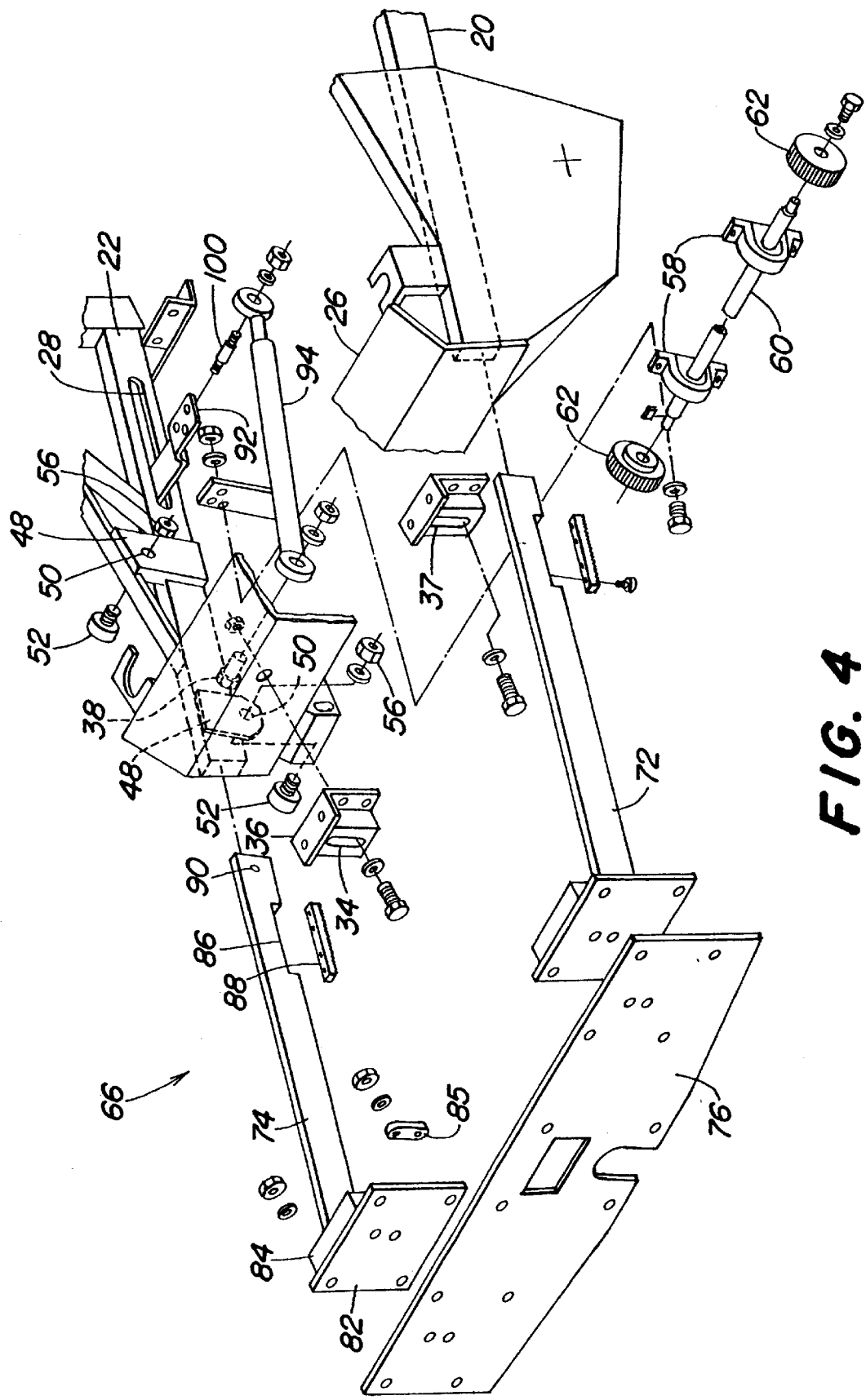
FIG. 4 is a detailed perspective representation of portions of the vehicle frame and the tool frame of the tool attachment.

The vehicle frame 12 serves for carrying the essential components of the lawn care vehicle 10, of which merely a drivers seat 16 is schematically illustrated. The vehicle frame 12 is supported on wheels 18 in order to move as well as support the lawn care vehicle on the ground. However, only the two front wheels are shown in the figure, i.e., the two steerable rear wheels are not shown. The left and right rails 20, 22 of the vehicle frame 12 which extend in the moving direction of the lawn care vehicle 10 are realized in the form of tubes with square or rectangular cross section in the embodiment shown and are of particular importance. However, it should be mentioned that it would also be possible to provide only one rail 20, 22 or more than two rails 20, 22. It would also be conceivable to realize the rails 20, 22 in the form of solid elements rather than tubes. FIG. 4 shows that the front ends 24 of the rails 20, 22 are connected to one another in the form of a "U" via a plate-shaped crosspiece 26 such that a rigid frame is formed. However, the connection by means of the crosspiece 26 is by no means mandatory.

The rails 20, 22 are positioned in the form of mirror images about the central longitudinal axis of the lawn care vehicle 10 and are arranged on the lawn care vehicle 10 in such a way that the vehicle frame 12 forms an angle with the ground. Consequently, the vehicle frame 12 is closer to the ground in the central region of the vehicle 10 than at the front end of the vehicle 10. Although the figure shows the protrusion of the vehicle frame 12 beyond the front end of the vehicle 10, this feature is also not mandatory; the vehicle frame 12 may also protrude laterally or toward the rear.

The right rail 22, viewed in the driving direction, is provided with a longitudinal slot 28 between its open ends. This longitudinal slot extends in the side 30 which faces the other rail 20, at least over the adjustment range of the tool attachment 14.

An opening 32, the purpose of which will be described below, is arranged on the underside of each rail 20, 22.

On the front side of the crosspiece 26, i.e., on the side that faces the tool attachment 14, a support 34 is arranged within the protruding region of each rail 20, 22, on each side. This support is realized in dimensionally stable fashion and provides a support surface 36, wherein said support also contains an opening 37 that is realized in the form of a slot.

A bolt 38 that extends through the central longitudinal axis of the longitudinal slot 28 is arranged on the side 30 behind the crosspiece 26.

Each rail 20, 22 is provided with front and rear recesses 40, 42 in the region of the crosspiece 26 and in the central region of the rail. The first recess is located at the bottom 44 of each rail 20, 22, the second at the top 46 of said rail. A plate 48 that contains a bore 50 is preferably welded or screwed to the side 30 within the region of each recess 40, 42.

A support roller 52 that is rotatably accommodated on a bolt member is assigned to each plate 48 and each recess 40, 42. Each bolt member is inserted into a corresponding bore 50 and secured with a nut 56. The support rollers and their respective positions relative to the rails 20, 22, are realized such that their circumferential surfaces slightly extend over the inner surface of the rail 20, 22.

A bearing bracket 58 is screwed or welded to each respective connecting rail (not shown) which connects the rails 20 and 22 to one another, within the region of the opening 32 in the bottom 44 of each rail 20, 22. These bearing brackets accommodate a rotatable shaft 60. Of course, the bearing brackets 58 may also be directly arranged on the rails 20, 22. The respective ends of the shaft 60 are equipped with wheels 62 that are connected to the shaft without rotational play. In the preferred embodiment shown, these wheels are realized in the form of toothed wheels. The two wheels 62 are thus also connected without rotational play. The distance between the wheels 62 on the shaft 60 and their arrangement on the shaft 60 relative to the rails 20, 22 are chosen such that the given wheel 62 protrudes into the interior of the respective rail 20, 22 through the openings 32. The shaft 60 is transverse to the longitudinal direction of the rails 20, 22. The mounting of the wheels 62 on the shaft 60 and the mounting of the bearing brackets 58 on the rails 20, 22 or at another location of the lawn care vehicle 10 or the vehicle frame 12 is realized by means of known fasteners that are not shown in detail, e.g., wedges and screws.

In addition, holders, brackets and sheet metal that are not shown in detail are arranged on the rails 20, 22. These elements represent parts of the lawn care vehicle 10 which are not essential to the invention.

In the preferred embodiment shown, the tool attachment 14 is composed of several tool units 64 and a tool frame 66.

The tool units 64 in the embodiment shown are realized in the form of known, hydraulically driven spiral-bladed mowers. Three tool units 64 are arranged adjacent to one another transverse to the driving direction, wherein the two outer tool units 64 are offset ahead of the central tool unit 64, i.e., away from the lawn care vehicle 10. In this way, it is possible for the central tool unit 64 to occupy the region between the wheels 18 during the operation of the lawn care vehicle, i.e., the tool attachment 14 will not protrude too far ahead of the lawn care vehicle 10. As seen from the driving direction, the two outer tool units and the central tool unit 64 overlap, i.e., no unmoved strips of grass will remain during mowing. All tool units 64 are at the same distance from the ground; their height can be adjusted by means of a lifting device 68 in order to adjust the tool units to a different cutting height or move the tool units into the transport position. For reasons of simplicity, only one lifting device 68 is shown for the embodiment shown. However, a separate lifting device may be provided for each tool unit, which embodiment is also covered by the term lifting device.

The two outer tool units 64 are suspended in vertically pivoted fashion in schematically represented bearings 70.

The design of the tool units 64 in the form of spiral-bladed mowers only represents an example of various types of tool units 64. It would also be possible to use raking devices, rotating blade mowers, vertical cutters, pick-up implements, clearing blades and the like.

In the embodiment shown, the tool frame 66 is composed of at least left and right bars 72, 74 and a carrier 76. A front carrying arm 78 and a rear carrying arm 80 are connected to this carrier 76 in the form of a separate attachment bracket that serves as the carrier for all tool units 64.

The tool frame 66 is essentially in the form of a U, wherein the base of the "U" extends transverse to the driving direction and the arms of the "U" extent in the driving direction. In addition, the tool frame can be moved relative to the vehicle frame 12 in the driving direction.

The left and right bars 72, 74 form mirror images about the longitudinal axis of the lawn care vehicle 10 and are provided with mounting plates 82 at their front ends in order to connect the carrier 76. Each mounting plate 82 is equipped with an abutment 84 on its rear side, i.e., on the side that faces the rails 20, 22. These abutments are arranged in such a way that they can be placed onto the respective supports 34 when the tool frame 66 is retracted. On the side of the abutment 84 which faces the vehicle frame 12, a pin 85 is provided which is designed and arranged on the abutment 84 in such a way that it is held in the respective opening 37 with almost no play and remaining secure in its position when the tool attachment 14 is retracted. The support 34 may be provided with a hard rubber block in which the opening 37 is arranged. The positive connection between the pin 85 and the opening 37 absorbs torsional movements of the tool attachment 14 relative to the vehicle frame 12 and consequently reduces relative movements and vibrations between said components.

The cross section and the orientation of the bars bar 72, 74 can be accommodated in a rail 20, 22 that faces the respective bar in sliding fashion.

A cutout 86 is provided on the underside of each bar 72, 74. This cutout serves to accommodate a toothed rack 88 that is aligned with the longitudinal direction of the bars 72, 74. The length of the toothed rack 88 depends on the range of adjustment of the tool frame 66.

Within the rear region of the right bar 74, a bore 90 is arranged which serves for accommodating a screw 100 for mounting a linear actuator or motor 94 on the bar 74. A holder 92 that is also arranged within this region may be utilized for mounting a valve or the like for controlling the motor 94.

The carrier 76 is realized in the form of a plate that is screwed to the two mounting plates 82 and is provided with a series of openings for connecting the carrying arms 78, 80. However, the bars 72, 74 may also be welded to the carrier 76.

The front carrying arm 78 extends forward from the carrier 76 in order to accommodate the two front, outer tool units 64 in the bearings 70.

The rear carrying arm 80 extends backward from the carrier 76 into the free space between the two wheels 18 in order to carry the central tool unit 64.

Both carrying arms 78, 80 may be engaged on the carrier 76 in rigid or vertically movable fashion or accommodate the tool units 64 such that they can be vertically moved in order to compensate for uneven areas in the ground.

A sensor (not shown) is arranged on the rails 22 and generates a signal as a function of whether the bars 72, 74 are pushed into the rails 20, 22 or not. However, it would suffice merely to detect a movement of one bar 72 or 74 relative to the given rail 20 or 22 respectively. The sensor may also be arranged at a different location, e.g., on the carrier 76.

The motor 94 is realized in the form of a hydraulic cylinder and piston assembly, wherein said motor can be actuated by means of a hydraulic control circuit (not shown). The hydraulic cylinder can be loaded on both sides of the piston, i.e., it can be actively adjusted in both directions. One end of the motor 94 is held via the bolt 38, and the other end is held on the bar 74 via the bolt 100. The mounting of the motor 94 via the bolts 38, 100 takes place as close as possible to the side 30 in order to keep bending moments to a minimum. However, it is also conceivable to use a pneumatic or electric motor, or equivalent structure, instead of the hydraulic motor 94. In addition, a mechanical rod assembly, mechanical levers or a tackle may be utilized instead of the motor 94.

The sensor is physically or logically coupled to the drive (not shown) of the tool units 64, the lifting device 68 and a pivoting motor (not shown) for the outer tool units 64, in such a way that said components cannot be actuated if the sensor indicates that the tool frame 66 is no longer in the retracted position. An additional connection of the sensor to the motor 94 and a safety interlock system (not shown) may also be provided.

The drive of the tool units 64 can alone be deactivated, or all of the drives can be deactivated.

According to the previous description, the lawn care vehicle has the following design and function.

The rails 20, 22 and the plate 48 represent part of the vehicle frame 12, i.e., fixed components of the lawn care vehicle 10, and are already installed in the correct position.

The tool frame 66 is assembled in the form of a U; the assembly includes the toothed racks 88, but not the bolt 100 and the holder 92. Subsequently, the bars 72 and 74 of the tool frame 66 are pushed into the hollow spaces of the rails 20, 22 such that the underside of each bar abuts the front support roller 52 and the upper side of each bar abuts the rear support roller 52. Consequently, a rolling support is achieved instead of a sliding support. Contact with the underside and the upper side is automatically attained due to the leverages during the insertion of the bars 72, 74. As soon as the bars 72, 74 are pushed into the rails 20, 22 up to the adjustment range, the wheels 62 begin to mesh with the toothed racks 88 and, from this moment, ensure a synchronous movement of both bars 72, 74 during the additional insertion. Consequently, tilting or jamming of the bars is hindered. As soon as the bars 72, 74 are entirely pushed into the rails 20, 22, the bolt 100 is inserted into the longitudinal slot 28 and screwed onto the inner side of the right bar 74. The motor 94 which is extended to its maximum length is then secured via the two bolts 38, 100 and connected to the hydraulic system (not shown).

In this inserted state, the sensor is activated and the abutments 84 rest on the supports 34 in order to relieve the bars 72, 74 that rest on the support rollers 52 in the rails 20, 22.

The carrying arms 78, 80 are installed individually or in the form of an attachment bracket that contains both carrying arms, whereafter the tool units 64 are attached to the carrier 76 and connected to the corresponding drive.

Figure 2:
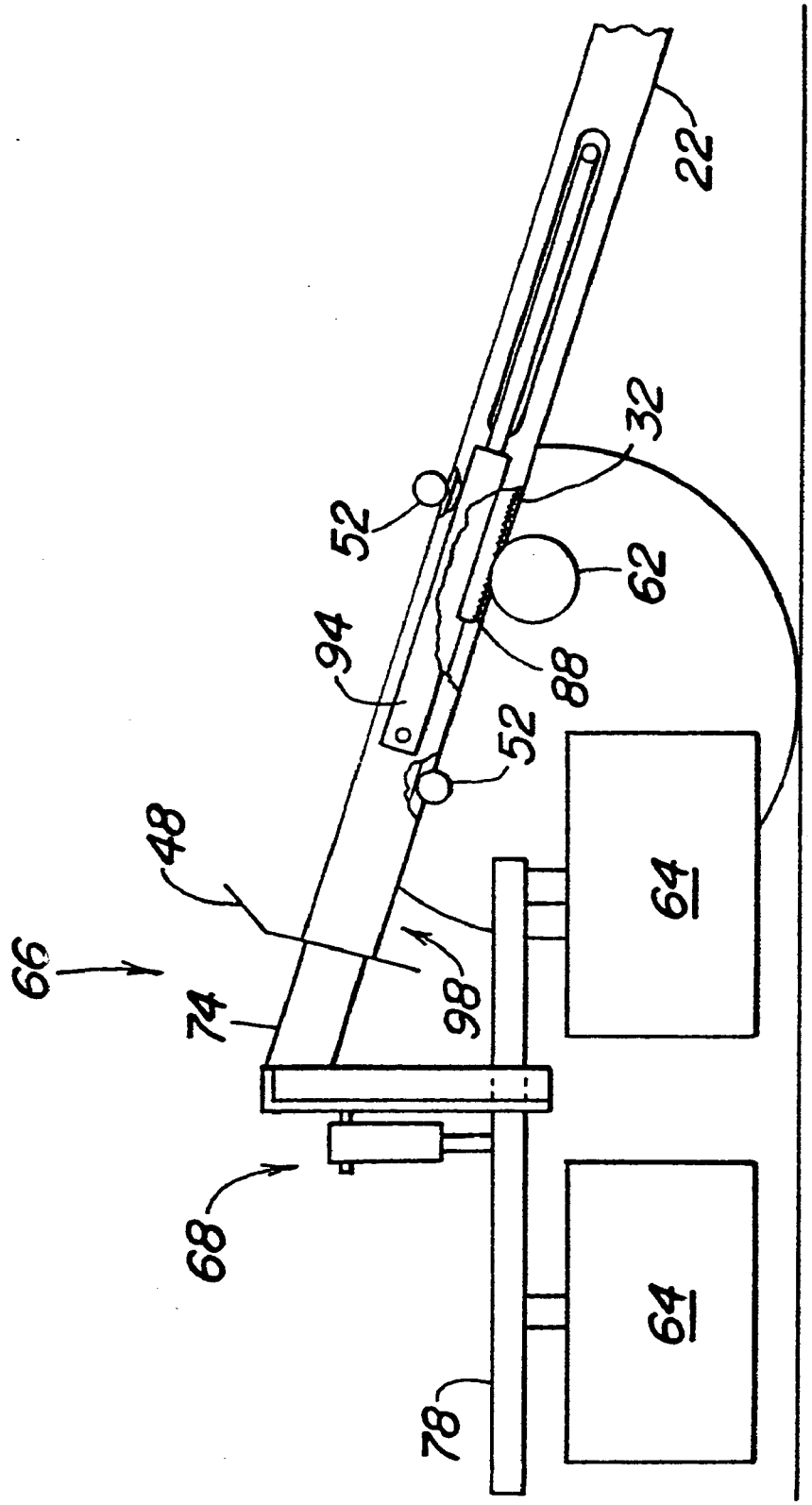
FIG. 2 is a partial side view of the lawn care vehicle according to FIG. 1, wherein the tool attachment is in its retracted operating position.

FIGS. 1 and 2 show the lawn care vehicle 10 with a tool attachment 14, the tool frame 66 of which is entirely pushed into the vehicle frame 12 and its respective rails 20, 22. In this position, the tool units 64 almost touch the ground and can be lowered onto the ground by means of at least one lifting device 68. The central tool unit 64 is located between the wheels 18, i.e., within a contour 98 of the lawn care vehicle 10 that, for example, is formed by the plate 26, the front edge of the wheels 18 or a structure of the lawn care vehicle 10 and may have a quite irregular shape.

In order to extend the tool frame 66, the hydraulic cylinder 94 extends such that it moves the bars 72, 74 inside the rails 20, 22, i.e., such that the tool attachment 14 is moved from a position in which it is near the lawn care vehicle 10 into a position in which it is farther away from the lawn care vehicle. This means that the tool attachment 14 with its tool units 64 is moved out of the boundary 98 of the lawn care vehicle 10 so that it may be serviced. The connection between the left toothed rack 88 and the left wheel 62 and the right toothed rack 88 and the right wheel 62 via the shaft 60 helps ensure a synchronous movement of both bars 72, 74.

It is quite obvious that a second motor 94, a second longitudinal slot 28 and a second set of bolts 38, 100 may be used instead of the toothed rack 88, the wheels 62 and the shaft 60, whereby the motors 94 could operate synchronously, e.g., by means of a synchronizer.

Figure 3:
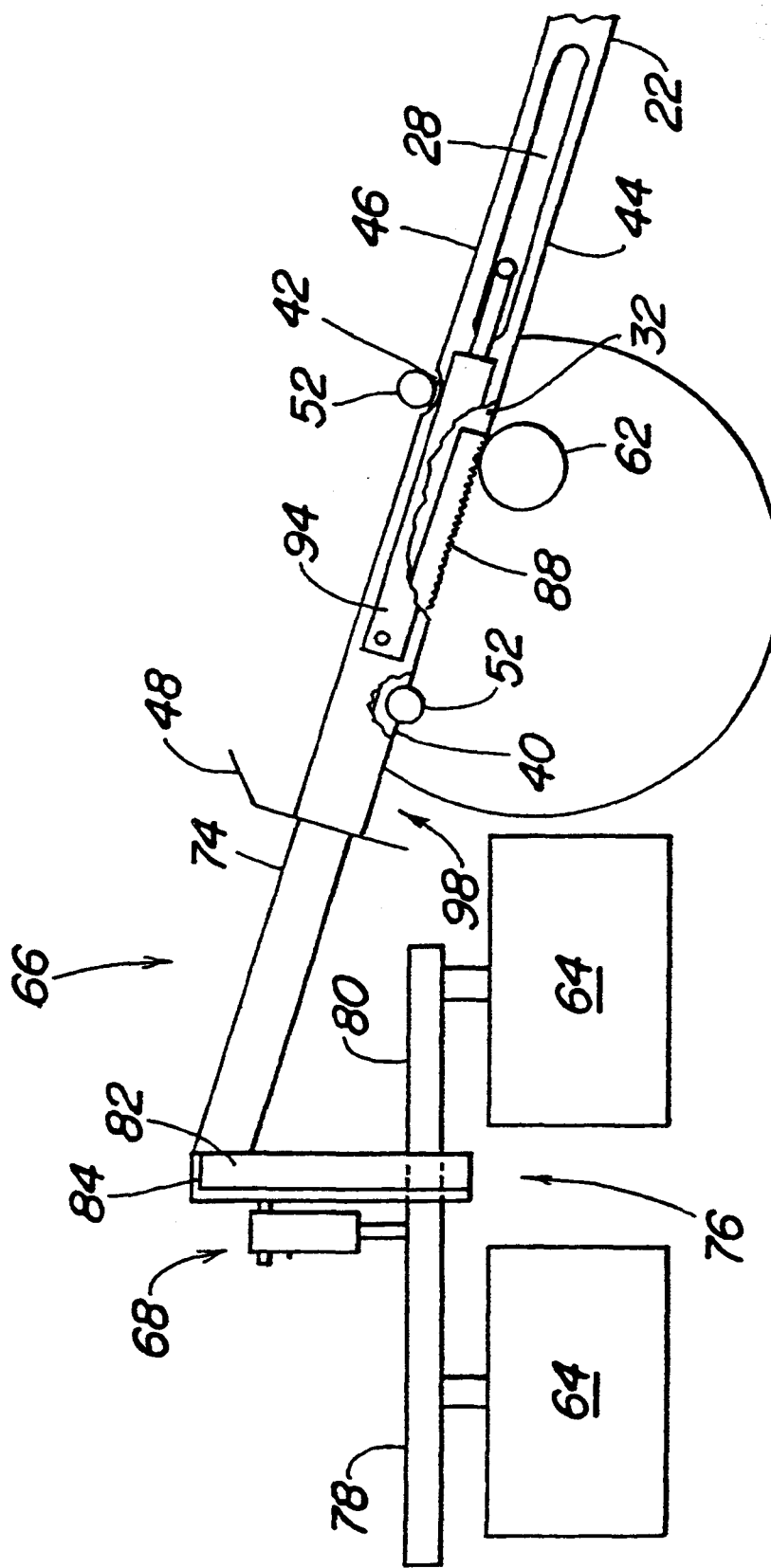
FIG. 3 is a partial side view of the lawn care vehicle according to FIG. 1, wherein the tool attachment is in the extended position.

In FIG. 3, the tool frame 66 is shown in its extended position, in which the central tool unit 64 is moved out of the region between the wheels 18, and into a position in which it is easily accessible for maintenance and service. Although the inclined arrangement of the rails 20, 22 is not absolutely mandatory, it is advantageous in that the tool units 64 can also be lifted off the ground in the extended position such that access to the tool units 64 is enhanced and maintenance simplified.

Since the sensor is no longer activated in this position, the drive cannot be actuated in the extended position in order to protect maintenance and service personnel.

What is claimed is:

1. A vehicle comprising:
    a vehicle frame,
    a plurality of elongate rail members mounted in fixed position with respect to the vehicle frame and oriented at an angle to a surface of the ground,
    a tool frame to which is coupled a tool attachment, said tool frame having a plurality of bars oriented in alignment with the rail members and shiftably supported by respective rails and linearly shiftable in operative engagement with said rails between retracted operating positions whereat the tool attachment is in an operating position in close proximity to the vehicle, and extended maintenance positions whereat the tool attachment is shifted upward and outwardly from the vehicle frame for providing access to the tool attachment,
    a synchronizer operatively extending between respective bars and which causes said bars to shift in unison relative to the respective rails
    wherein the synchronizer further comprises
        a plurality of wheels in engagement with respective bars, and
        a shaft supported by the vehicle and to which the wheels are fixed, said wheels and shaft rotate in unison to synchronize the shifting of the bars with respect to the rails, and
    wherein the wheels include gear teeth which engage toothed racks on the respective bars.

2. A vehicle comprising:
    a vehicle frame, a plurality of rail members mounted with the vehicle frame, a tool frame to which is coupled a tool attachment, said tool frame comprising a plurality of bars being shiftably supported by respective rails and linearly shiftable in operative engagement with said rails between a retracted operating position whereat the tool attachment is in an operating position in close proximity to the vehicle, and an extended maintenance position whereat the tool attachment is shifted upward and outwardly from the vehicle frame for providing access to the tool attachment, said bar having a shape corresponding to the shape of the rails, the tool attachment in the operating position is at least partially within the boundary of the vehicle, the rails are elongated and oriented at an angle to a surface of the ground, and the bars are elongated and oriented in alignment with respective rails and shift generally along said rails upward and outwardly away from the vehicle as the tool frame shifts to the extended maintenance position, the rails extend generally longitudinally in the direction of vehicle travel and the tool frame is shiftable along the rails generally longitudinally in the direction of vehicle travel, a linear actuator engaged with the tool frame for shifting the tool frame between the extended and retracted positions, the bars are received within respective rails and are shiftable therein in telescoping fashion, a plurality of wheels in engagement with respective bars, a shaft supported by the vehicle and to which the wheels are fixed, said wheels and shaft rotate in unison to synchronize the shifting of the bars with respect to the rails.

3. The invention of claim 2, wherein the wheels include gear teeth which engage toothed racks on the respective bars.

4. The invention of claim 2, and further comprising a support mounted with the vehicle frame and which engages the tool frame in the retracted position for at least partially supporting the tool frame in the retracted position.

5. The invention of claim 4, wherein the bar is movably carried by the rail between at least one lower and one upper support roller.

6. The invention of claim 5, wherein the tool attachment further comprises mower units which are supported by the tool frame in overlapping fashion.

7. A vehicle comprising:

a vehicle frame, a plurality of rail members mounted with the vehicle frame, a tool frame to which is coupled a tool attachment, said tool frame comprising a plurality of bars being shiftably supported by respective rails and linearly shiftable in operative engagement with said rails between a retracted operating position whereat the tool attachment is in an operating position in close proximity to the vehicle, and an extended maintenance position whereat the tool attachment is shifted upward and outwardly from the vehicle frame for providing access to the tool attachment, said bar having a shape corresponding to the shape of the rails, the tool attachment in the operating position is at least partially within the boundary of the vehicle, the rails are elongated and oriented at an angle to a surface of the ground, and the bars are oriented in alignment with respective rails and shift generally along said rails upward and outwardly away from the vehicle as the tool frame shifts to the extended maintenance position, the rails extend generally longitudinally in the direction of vehicle travel and the tool frame is shiftable along the rails generally longitudinally in the direction of vehicle travel, a linear actuator engaged with the tool frame for shifting the tool frame between the extended and retracted positions, the bars are received within respective rails and are shiftable therein in telescoping fashion, a plurality of wheels in engagement with respective bars, a shaft supported by the vehicle and to which the wheels are fixed, said wheels and shaft rotate in unison to synchronize the shifting of the bars with respect to the rails, wherein the wheels include gear teeth which engage toothed racks on the respective bars.

8. A vehicle comprising:

a vehicle frame, a plurality of elongate rail members mounted in fixed position with respect to the vehicle frame and oriented at an angle to a surface of the ground, a tool frame to which is coupled a tool attachment, said tool frame having a plurality of bars oriented in alignment with the rail members and shiftably supported by respective rails and linearly shiftable in operative engagement with said rails between retracted operating positions whereat the tool attachment is in an operating position in close proximity to the vehicle, and extended maintenance positions whereat the tool attachment is shifted upward and outwardly from the vehicle frame for providing access to the tool attachment, means for ensuring synchronous movement of said bars wherein said tool attachments are mower units.

9. A vehicle comprising:

a vehicle frame, a plurality of elongate rail members mounted in fixed position with respect to the vehicle frame and oriented at an angle to a surface of the ground, a tool frame to which is coupled a tool attachment, said tool frame having a plurality of bars oriented in alignment with the rail members and shiftably supported by respective rails and linearly shiftable in operative engagement with said rails between retracted operating positions whereat the tool attachment is in an operating position in close proximity to the vehicle, and extended maintenance positions whereat the tool attachment is shifted upward and outwardly from the vehicle frame for providing access to the tool attachment, means for ensuring synchronous movement of said bars, wherein the means for ensuring synchronous movement of the bars further comprises a plurality of wheels in engagement with respective bars, and a shaft supported by the vehicle and to which the wheels are fixed, said wheels and shaft rotate in unison to synchronize the shifting of the bars with respect to the rails, and wherein the wheels include gear teeth which engage toothed racks on the respective bars, wherein said tool attachments are mower units.

10. A vehicle comprising:

a vehicle frame, a plurality of elongate rail members mounted with the vehicle frame and oriented at an angle to a surface of the ground, a tool frame to which is coupled a tool attachment, said tool frame having a plurality of bars oriented in alignment with the rail members and shiftably supported by respective rails and linearly shiftable in operative engagement with said rails between retracted operating positions whereat the tool attachment is in an operating position in close proximity to the vehicle, and extended maintenance positions whereat the tool attachment is shifted upward and outwardly from the vehicle frame for providing access to the tool attachment, means for ensuring synchronous movement of said bars, wherein said means for ensuring synchronous movement of the bars further comprises:
- a plurality of wheels in engagement with respective bars,
- a shaft supported by the vehicle and to which the wheels are fixed, said wheels and shaft rotate in unison to synchronize the shifting of the bars with respect to the rails, wherein the wheels include gear teeth which engage toothed racks on the respective bars.

11. A vehicle comprising:

a vehicle frame, a plurality of elongate rail members mounted with the vehicle frame and oriented at an angle to a surface of the ground, a tool frame to which is coupled a tool attachment, said tool frame having a plurality of bars oriented in alignment with the rail members and shiftably supported by respective rails and linearly shiftable in operative engagement with said rails between retracted operating positions whereat the tool attachment is in an operating position in close proximity to the vehicle, and extended maintenance positions whereat the tool attachment is shifted upward and outwardly from the vehicle frame for providing access to the tool attachment, means for ensuring synchronous movement of said bars, wherein said tool attachments are mower units.

* * * * *